Patented June 3, 1941

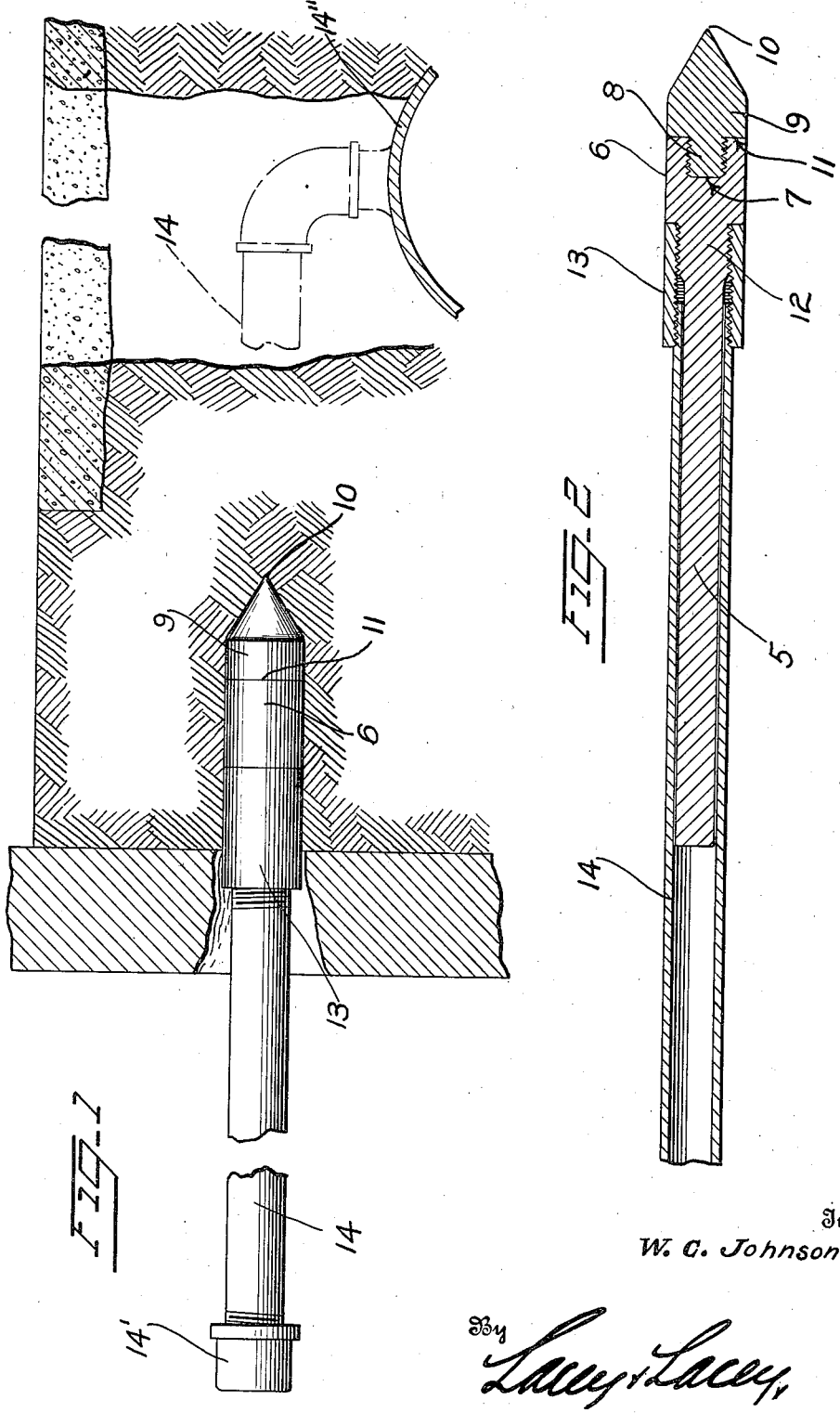

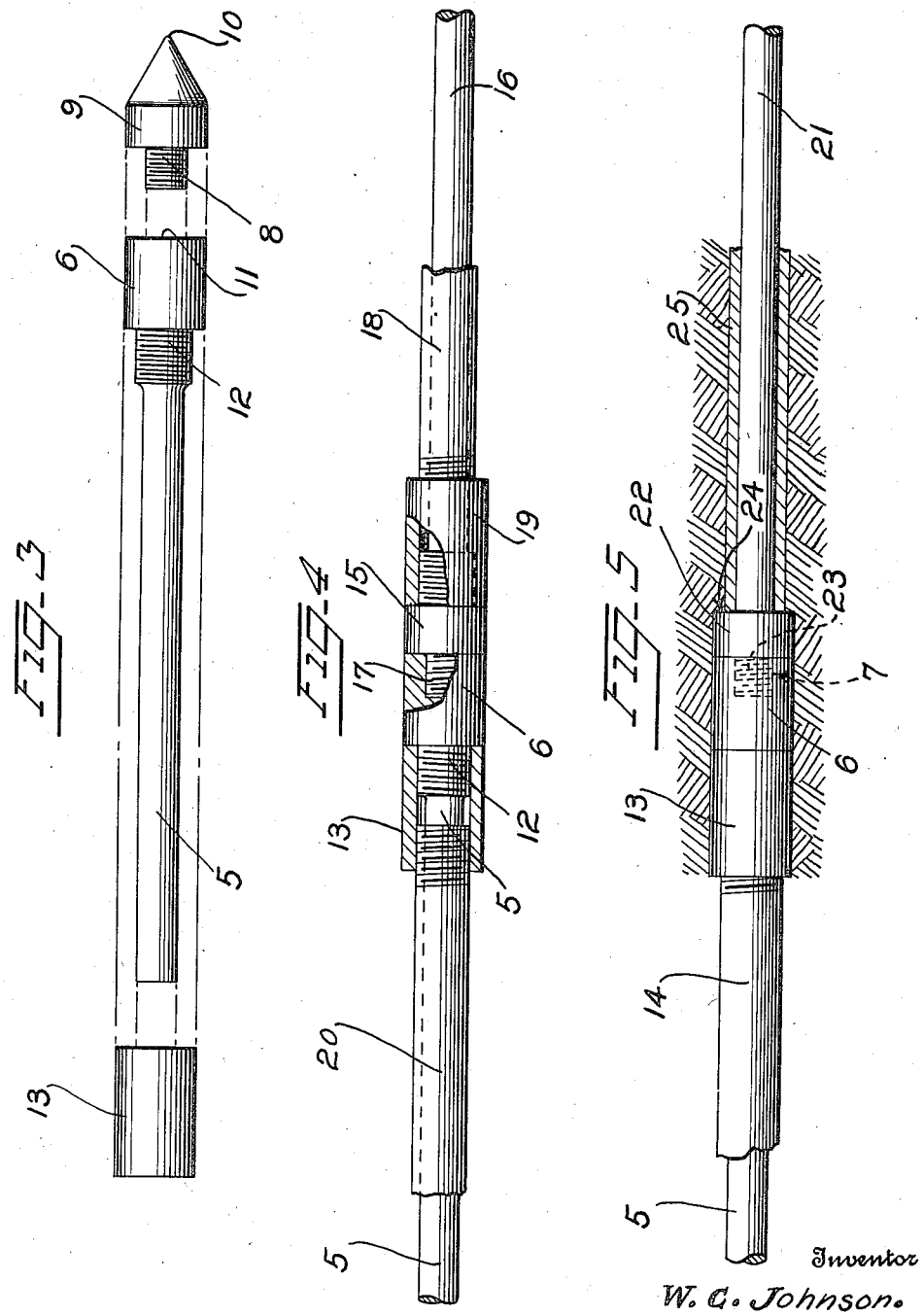

2,244,202

UNITED STATES PATENT OFFICE 2,244,202

TOOL FOR LAYING AND REMOVING UNDERGROUND PIPES

William C. Johnson, Harrisburg, Pa.

Application October 4, 1939, Serial No. 297,949

5 Claims. (Cl. 255—1)

This invention relates to devices for laying pipes and more particularly to a manually operated tool especially designed for use by plumbers and others in laying or renewing water pipes, conduits and the like.

The object of the invention is to provide a tool of simple and inexpensive construction, by means of which a water pipe or other conduit may be quickly laid underground and tapped into the city water main and house connections, respectively, without the necessity of digging the usual trench or excavation and with very little labor on the part of the operator.

A further object of the invention is to provide a pipe laying tool including a body portion having a driving head detachably mounted thereon and provided with a threaded sleeve for engagement with a section or sections of pipe to be laid so that by imparting successive blows to the outer end of said pipe section or sections the driving head will form an opening through the wall of a building and beneath the surface of the street to accommodate the pipe being laid.

A further object of the invention is to provide a pipe laying tool, the construction of which is such that it can be used with equally good results either for laying new pipes or removing old or damaged pipes, means being provided for facilitating the removal of either threaded or unthreaded damaged pipes.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a side elevation, partly in section, of a pipe laying tool constructed in accordance with the present invention showing the manner of using the tool for laying new pipe, Figure 2 is a longitudinal sectional view of the tool, Figure 3 is a side elevation showing the different parts comprising the tool separated for sake of clearness, Figure 4 is a side elevation, partly in section, showing the construction of the attachment used in removing threaded damaged pipes and at the same time installing a new pipe, and Figure 5 is a side elevation of the tool used for removing damaged pipes, the ends of which are not threaded.

The improved pipe laying tool forming the subject-matter of the present invention comprises a longitudinally disposed body portion 5 preferably in the form of a solid rod, the inner end of which is formed with an integral collar 6 having a threaded socket 7 therein for engagement with a threaded extension 8 of a detachable driving head 9. The driving head 9 is substantially conical in shape and provided at its forward end with a driving point 10, while the rear end of the head is formed with a flat face 11 adapted to bear against the adjacent end of the collar 6 and receive the impact thereof when laying a pipe, as will be more fully explained hereinafter.

The body portion 5 at the rear of the collar 6 is threaded, as indicated at 12, for engagement with a correspondingly threaded sleeve 13 which sleeve serves to receive the adjacent threaded end of the new pipe section to be laid and indicated at 14. The rear end of the body portion or rod 5 projects within the new pipe section 14 a sufficient distance to support said pipe section and adjacent sections which may be connected therewith when the tool is forced through the ground in the act of laying the pipes.

In operation, if it is desired to lay a pipe beneath the surface of the street and connect said pipe with the plumbing in a house and water main respectively, the first pipe section to be laid is fitted over the rod or body portion 5 and threaded into the sleeve 13, after which repeated blows are imparted to the end of the new pipe section 14 or to a cap 14' mounted thereon, thereby causing the driving head 9 to pierce the earth or concrete and form an opening for said pipe section. As the new pipe section 14 is forced longitudinally through the opening formed by the driving head 9, new sections of pipe are connected with the pipe section 14 and forced through the opening made by the driving head by tapping on the end of the last pipe section, and this operation is repeated until the desired length of pipe has been installed. The sleeve 13 is then disconnected from the inner pipe section and the adjacent end of the latter tapped into the water main 14", it, of course, being understood that the other end of the newly laid pipe will be connected to the plumbing fixtures in the house in the usual manner. By use of this tool, new pipe sections may be laid underground without the necessity of digging the usual trenches and with less time and labor on the part of the operator than heretofore.

In certain cases, old pipe sections must be removed from the ground before new pipes can be laid, and in order to facilitate the removal of said old, broken or damaged pipes, I have provided an attachment which is interchangeable with the driving head 9, such an attachment being shown in Figures 4 and 5 of the drawings. The attachment for removing old or broken pipes is similar in construction to the tool shown in Figure 1 of the drawings, with the exception that the integral collar 15 on the end of the body portion or rod 16 is provided with a threaded extension 17 adapted to engage the threads of the socket 7 after the driving head 9 has been removed therefrom, as best shown in Figure 4 of the drawings. In using the attachment for removing old pipes, the adjacent threaded end of the old pipe, indicated at 18, is threaded into the sleeve 19 and the new pipe section 20 to be laid is fitted over the rod or body portion 5 of the tool and threaded into the sleeve 13. By then imparting a series of sharp blows to the end of the new pipe section 20, the old pipe 18 will be forced longitudinally through the ground and the new pipe 20 be fed into the opening formed by the removal of the old pipe section or sections. In removing an old pipe, it will, of course, be necessary to make a small excavation in the ground at the point where the old pipe section is to be removed and as said damaged pipe is forced through the ground by impact on the end of the new pipe, the workman will bend the old pipe so that it can be readily removed from the excavation, after which the new pipe will be detached from the sleeve 13 and connected with the water main, as will be readily understood.

In case the broken or damaged pipe to be removed from the ground is not threaded, I provide an attachment of the construction shown in Figure 5 of the drawings, said attachment comprising a body portion or rod 21 devoid of threads throughout its entire length and provided with an integral collar 22 having a threaded extension 23 adapted to engage the socket 7. In this form of the device, the collar 22 is provided with a flat face 24 and the adjacent end of the broken pipe section 25 fits snugly against said face, the construction of the device and manner of using the same being otherwise similar to that previously explained.

While the tool is principally designed for use by plumbers in removing broken or damaged pipes and installing new pipes, it will, of course, be understood that said tool may be used with equally good results for forming openings or conduits through any kind of hard material for the reception of electric conductors and the like. It will, furthermore, be understood that the tools may be made in different sizes and shapes and constructed of any suitable material without departing from the spirit of the invention.

Having thus described the invention, what is claimed as new is:

1. A tool of the class described comprising a body portion, one end of which is adapted to receive and support a new pipe section, a collar formed on the other end of the body portion and provided with a threaded socket, a rod adapted to receive and support a damaged pipe section, and a threaded portion formed on the rod and adapted to detachably engage the threaded socket in said collar.

2. A tool of the class described comprising a body portion, one end of which is adapted to receive and support a new pipe section, a collar carried by the body portion and provided with a threaded socket, a sleeve threaded on said body portion and against which the new pipe section bears, a rod adapted to receive and support an old pipe section and provided with a threaded extension detachably engaging the threads of the socket, a collar formed on the rod, and a sleeve mounted on the rod and interposed between the last-mentioned collar and said old pipe section.

3. A tool of the class described comprising a body portion, one end of which is adapted to receive and support a new pipe section, a collar formed on the other end of the body portion and provided with a threaded socket, a sleeve mounted on the body portion and having one end thereof bearing against the collar and its other end engaging the new pipe section, a rod having a threaded portion detachably engaging the threads of the socket and adapted to receive and support a damaged pipe section, and a collar formed on said rod against which the damaged pipe section bears.

4. A tool of the class described comprising a longitudinally disposed body portion, one end of which is cylindrical in cross section and adapted to receive and support a new pipe section, a collar formed on the other end of the body portion and provided with a threaded socket, a driving head having a threaded extension detachably engaging the threads of said socket, and a rod having a threaded portion adapted to engage the threads of the socket when the driving head is removed and adapted to receive and support a damaged pipe section.

5. A tool of the class described comprising a body portion adapted to receive and support a section of new pipe with the end of the pipe extending longitudinally beyond said body portion, a rod detachably secured to the body portion and adapted to receive and support a section of damaged pipe, and a stop collar carried by the rod and interposed between the new and damaged pipe sections whereby when a series of blows are imparted to the end of the new pipe section the damaged pipe section will be displaced and the new pipe section take its place.

WILLIAM C. JOHNSON.